United States Patent [19]

Evers

[11] Patent Number: 4,859,326

[45] Date of Patent: Aug. 22, 1989

[54] ELECTROLYTIC TUBULAR MIXER-SETTLER

[75] Inventor: Heinz Evers, Busenberg, Fed. Rep. of Germany

[73] Assignee: Wiederaufarbeitungsanlage Karlsruhe Betriebsgesellschaft mbH, Eggenstein-Leopoldshafen, Fed. Rep. of Germany

[21] Appl. No.: 233,248

[22] Filed: Aug. 17, 1988

[30] Foreign Application Priority Data

Aug. 18, 1987 [DE] Fed. Rep. of Germany ....... 3727481

[51] Int. Cl.⁴ .............................................. B01D 11/04
[52] U.S. Cl. .................................. 210/197; 210/511; 422/259
[58] Field of Search ................ 422/259; 210/197, 634, 210/511; 204/269, 273

[56] References Cited

U.S. PATENT DOCUMENTS 3,869,374 3/1975 Goldacker et al. ............. 204/269 X

Primary Examiner—Frank Spear
Attorney, Agent, or Firm—Walter Ottese

[57] ABSTRACT

The invention is directed to a multi-stage mixer-settler for use in the liquid-liquid countercurrent extraction process with tubular stages disposed at a distance from and parallel with one another in a horizontal plane with each stage including a settling chamber. A vertically mounted rotatable agitator is provided in the mixing chamber. In order to be able to use the tubular mixer-settler also for the separation of substances of value, a housing of the tubular mixer-settler is connected to act as a cathode and anodes are disposed in the settling chamber.

3 Claims, 1 Drawing Sheet

U.S. Patent   Aug. 22, 1989   4,859,326
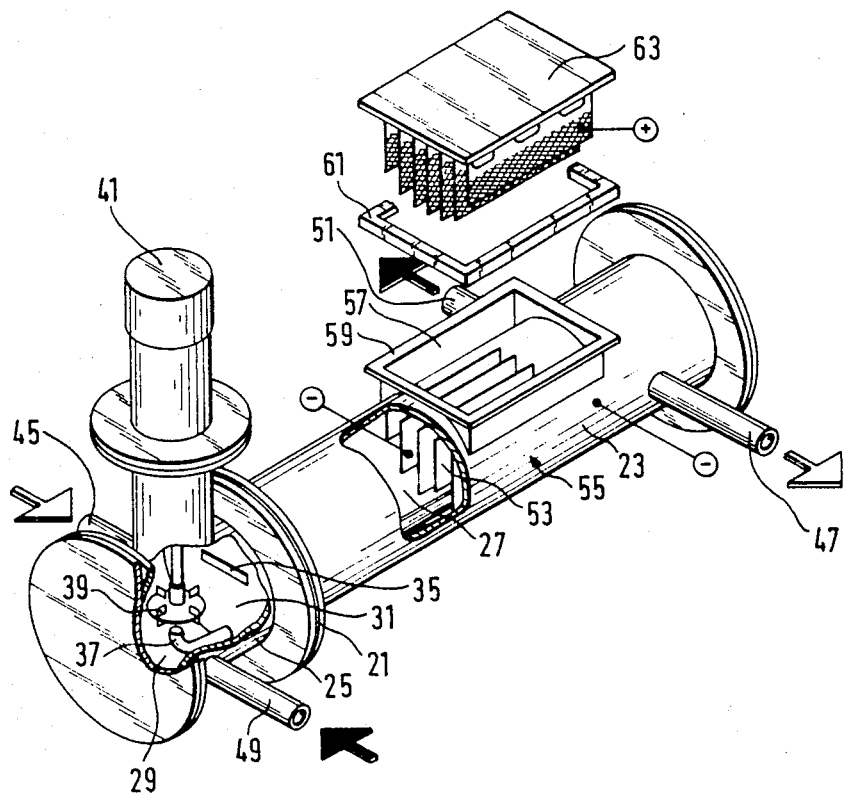

4,859,326

ELECTROLYTIC TUBULAR MIXER-SETTLER

FIELD OF THE INVENTION

The invention relates to a multi-stage tubular mixer-settler for liquid-liquid countercurrent extraction wherein two phases are mixed.

BACKGROUND OF THE INVENTION

A multi-stage tubular mixer-settler is disclosed in U.S. patent application Ser. No. 044,790, filed on May 1, 1987. This tubular mixer-settler is geometrically critically safe while providing a high throughput capability. The configuration of this tubular mixer-settler permits specific mixing and settling operations. This tubular mixer-settler provides a good extraction and has been utilized with great success for this purpose.

SUMMARY OF THE INVENTION

It is an object of the invention to improve the tubular mixer-settler of the kind referred to above so that it can be also utilized in other separating processes which occur in the reprocessing of irradiated nuclear fuels. It is intended in particular to achieve the separation from each other of the dissolved useful materials uranium and plutonium.

According to a feature of the invention, the housing of one or more stages of the tubular mixer-settler is connected as a cathode and anodes are inserted from above into the housing in the region of the settling chamber of the stage.

The configuration of the tubular mixer-settler according to the invention causes the mixer-settler to acquire a dual function. The electrolytic method of operation is combined with an extractive separation. The settling chamber is at the same time used as an electrolysis chamber.

Electrolysis has been found to be an advantageous method for Pu/U-separation. In this connection reference may be made to published German patent application DE-OS No. 21 49 089.

According to a further feature of the invention, additional cathode plates are disposed in the settling chamber and are arranged so as to be in the throughflow direction. With this embodiment, high levels of throughput are possible since the effective electrode surface is enlarged.

According to still another embodiment of the invention, a recycling conduit is mounted to extend between the mixing chamber and the settling chamber. The reaction yield is increased by the recycling conduit and the return of one phase.

BRIEF DESCRIPTION OF THE DRAWING

The single figure of the drawing is a perspective view of only one stage of the tubular mixer-settler according to the invention.

DESCRIPTION OF THE PREFERRED EMBODIMENTS OF THE INVENTION

The stage shown includes two tube lengths 23 and 25 attached to each other by a flanged connection 21. The longer tube length 23 constitutes the settling chamber 27 while the shorter tube length 25 forms the mixing chamber 29. Mixing chamber 29 and settling chamber 27 are separated from each other by a vertical wall 31 in which there is a pass-through opening 35 which is masked by a hood.

Mixing and settling chambers 29, 27 are also interconnected by a conduit 37 which passes through the vertical wall 31. An agitator mechanism 39 with an associated drive 41 is provided in the mixing chamber 29.

The organic phase which carries the useful substance enters the mixing chamber 29 through a pipe stub 45. The organic phase is drawn off at the end of the settling chamber 27 through a pipe 47 at the other end as shown and in exactly the same way it is fed outside of this stage into the mixing chamber of an adjacent stage. In this direction the organic phase passes through all the stages of the tubular mixer-settler and is extracted through a pipe stub at the end of the last stage. The stages are arranged one next to the other as shown in FIG. 1 of my above-mentioned U.S. patent application Ser. No. 044,790 which is incorporated herein by reference.

The aqueous phase is delivered to the mixing chamber 29 through a pipe 49 and, at the end of the settling chamber 27, the aqueous phase is extracted through a pipe 51 and, outside the stage, is introduced into the mixing chamber of the adjacent stage. In this direction, the aqueous phase passes through the tubular mixer-settler in countercurrent to the organic phase.

Vertical cathode plates 53 are disposed in the direction of flow in the settling chamber 27. The housing 55 of the tubular mixer-settler is additionally connected as a cathode. In the region of the settling chamber 27, the housing 55 is provided with an elongated opening 57 defined by a flange 59 on which there rests an anode assembly 63 of which the anode plates protrude between the vertical cathode plates 53. An insulator 61 is interposed between the flange 59 and the anode assembly 63.

The operation of the tubular mixer-settler will now be described.

The purpose of the tubular mixer-settler described above is to provide an electrolytic reduction of uranium and plutonium in a continuous separation process. Uranium and plutonium are both present in the organic phase which carries the useful substances. It is intended to reduce the uranium-VI partly to uranium-IV and the plutonium-IV to plutonium-III. This takes place by electrochemical reaction in the settling chamber 27 because of the voltage applied between the electrodes.

The organic phase which runs off contains the tetravalent and hexavalent uranium. The run-off of the aqueous phase contains the trivalent plutonium which in this level of valency, is no longer soluble in the organic phase. The separation of the two substances from each other is carried out in this electrolytic tubular mixer-settler over a plurality of stages.

If the settled aqueous phase is intended to be recycled in order to improve the reaction yield, then this phase is returned through the conduit 37 of a predetermined conduit cross section from the settling chamber 27 and passes from the conduit 37 directly under the agitator 39 in the mixing chamber 29. Thus, it is possible to establish the quantity of recycled aqueous phase by the agitator speed and the cross section of the conduit. In this way, the phase ratio in the tubular mixer-settler can be kept close to unity independently of the external phase ratio selected.

The recycling conduit 37 extends between the two chambers 27 and 29 as shown in the drawing and as shown in greater detail in FIG. 3 of my U.S. patent application Ser. No. 044,790, filed May 1, 1987, incorporated herein by reference.

It is understood that the foregoing description is that of the preferred embodiments of the invention and that various changes and modifications may be made thereto without departing from the spirit and scope of the invention as defined in the appended claims.

What is claimed is:

1. A multi-stage tubular mixer-settler for liquid-liquid countercurrent extraction wherein two phases are mixed, the multi-stage tubular mixer comprising:

a plurality of mutually adjacent tubular extraction stages arranged in a horizontal plane;

each of said tubular extraction stages having first and second end walls and including first and second horizontal tubular sections connected together so as to be mutually adjacent and aligned with respect to each other;

said first tubular section including said first end wall and defining a mixing chamber, said first tubular section including a rotary agitator mounted thereon;

said second tubular section including said second end wall and defining a settling chamber;

each of said tubular extraction stages further including: first and second inputs communicating with the mixing chamber thereof for bringing in respective ones of the phases; and, a partition wall having an opening formed therein and arranged between the mixing and settling chambers thereof for separating the latter from each other;

first conduit means and second conduit means for connecting the settling chamber of each extraction stage with the respective mixing chambers of corresponding ones of the next adjacent extraction stages for obtaining the countercurrent;

a housing formed in at least one of said tubular extraction stages and connected so as to define a cathode; and, an anode assembly mounted in said housing in the region of the settling chamber of said one tubular extraction stage.

2. The tubular mixer-settler of claim 1, wherein said housing is formed in the settling chamber of said one tubular extraction stage; and, said tubular mixer-settler further comprising a plurality of cathode plates mounted in said housing so as to be arranged in the direction of the through-flow passing through said settling chamber.

3. The tubular mixer-settler of claim 1, wherein at least one of said tubular extraction stages further includes a recycling conduit having respective ends in said chambers thereof and passing through said partition wall for conducting one of the phases from the settling chamber of said one stage to the mixing chamber thereof; and, said rotary agitator being mounted in said mixing chamber for mixing said phases therein, said rotary agitator being disposed in operative proximity to the end of said recycling conduit in said mixing chamber for also developing a suction force in said recycling conduit to transfer a predetermined quantity of said one phase from said settling chamber to said mixing chamber.

* * * * *

UNITED STATES PATENT AND TRADEMARK OFFICE
CERTIFICATE OF CORRECTION

PATENT NO. : 4,859,326

DATED : August 22, 1989

INVENTOR(S) : Heinz Evers

It is certified that error appears in the above-identified patent and that said Letters Patent is hereby corrected as shown below:

On the title page, next to "Attorney, Agent, or Firm--" delete "Walter Ottese" and substitute -- Walter Ottesen -- therefor.

In column 1, line 40: insert a comma between "connection" and "refer-".

Signed and Sealed this

Fifth Day of June, 1990

Attest:

HARRY F. MANBECK, JR.

Attesting Officer

Commissioner of Patents and Trademarks